United States Patent [19]

Godfroid

[11] 4,424,475

[45] Jan. 3, 1984

[54] APPARATUS FOR CONTROLLING A STATIC AC/AC THYRISTOR CONVERTER WHICH FEEDS A SYNCHRONOUS ROTATING MACHINE AT A VARIABLE FREQUENCY

[75] Inventor: Henri Godfroid, Valdoie, France

[73] Assignee: CGEE Alsthom, Levallois-Perret, France

[21] Appl. No.: 380,599

[22] Filed: May 21, 1982

[30] Foreign Application Priority Data

May 27, 1981 [FR] France .................. 81 10613

[51] Int. Cl.³ .................. H02P 5/34; H02M 5/45
[52] U.S. Cl. .................. 318/803; 318/723; 363/37
[58] Field of Search ............. 318/798–803, 318/723, 807–811; 363/37, 136, 137, 138

[56] References Cited

U.S. PATENT DOCUMENTS

| 3,919,609 | 11/1975 | Klautschek et al. | 318/803 |
| 4,188,659 | 2/1980 | Cailloux | 318/803 |
| 4,240,020 | 12/1980 | Okuyama et al. | 318/800 |
| 4,267,498 | 5/1981 | Torok | 318/800 |
| 4,282,570 | 8/1981 | Kurosawa et al. | 363/37 |

FOREIGN PATENT DOCUMENTS 2385252 10/1978 France .

Primary Examiner—J. V. Truhe
Assistant Examiner—Partick Keane
Attorney, Agent, or Firm—Sughrue, Mion, Zinn, Macpeak and Seas

[57] ABSTRACT

Apparatus for controlling a static AC/AC thyristor converter which supplies power to a synchronous rotating machine (7) at a variable frequency. The converter comprises a "machine" bridge (PM) and a "mains" bridge (PRA, PRB) connected to each other by a first conductor (9) and by a second conductor (10), together with an auxiliary connection (8) which connects the neutral point of the synchronous machine to a point (11) at the "mains" bridge end via which point current can be returned to a transformer which supplies power to said "mains" bridge. The control apparatus comprises means for controlling the "mains" bridge in such a way that the sum of the currents IA+IB of said first conductor (9) and of said second conductor (10) interconnecting the "machine" and "mains" bridges are equal to an average reference current.

3 Claims, 4 Drawing Figures

4,424,475

APPARATUS FOR CONTROLLING A STATIC AC/AC THYRISTOR CONVERTER WHICH FEEDS A SYNCHRONOUS ROTATING MACHINE AT A VARIABLE FREQUENCY

BACKGROUND OF THE INVENTION

Published French Pat. No. 2 385 252 describes "A static AC/AC thyristor converter system for a self-driven synchronous motor" in which an AD/DC "mains" bridge powers a DC/AC "machine" bridge which in turn powers said motor. Means are provided to reduce the detrimental effect on the motor torque of switching operations in the "machine" bridge. Said detrimental effect is caused when operating at low frequency, i.e. at less than the minimum frequency at which the "machine" bridge can operate in natural switching mode. This happens because the electromotive force of the machine is too low, and consequently the "machine" bridge is then made to operate in forced switching mode which is sometimes referred to as sequential or rhythmic mode by controlling the "mains" thyristor bridge with thyristor firing angles α such that it is operating in "full inverter" mode.

The thyristors of the "machine" bridge are then switched when they are passing no current. Such operation consequently cancels the motor torque at each switching operation of the "machine" bridge in the very low speed range.

In the above-mentioned patent, said drawback is mitigated by adding an auxiliary connection which connects the centre of the star-wound stator of the synchronous motor to the centre of the star-wound stator of the secondary winding of the transformer which feeds the "mains" bridge or else, in the case where the "mains" network is constituted by two complete bridges series-connected, to the point where the two bridges are series-connected; and by controlling the upper half bridge separately from the lower half bridge or else by controlling the two series-connected bridges separately.

This allows the current to be maintained in the non-switched phase of the motor, the current circulating in one of the two connections which connect the "mains" bridge to the "machine" bridge and in the auxiliary connection. Therefore, about half the nominal current and therefore also half the torque is maintained, thus reducing pulsation of the torque.

The present invention aims to reduce the torque pulsation to practically zero.

SUMMARY OF THE INVENTION

The invention provides apparatus for controlling a static AC/AC thyristor converter for supplying power to a synchronous rotating machine and comprising a "machine" bridge and a "mains" bridge connected to each other by a first conductor and by a second conductor, together with an auxiliary connection which connects the neutral point of the synchronous machine to a point at the "mains" bridge end via which point current can be returned to the transformer which supplies power to said "mains" bridge, wherein the control apparatus comprises means for controlling the "mains" bridge in such a way that the sum of the current IA+IB of said first and second conductors interconnecting the "machine" and the "mains" bridges is equal to an average reference current.

BRIEF DESCRIPTION OF THE DRAWINGS

The invention will be better understood from the following description given by way of example with reference to the accompanying drawings in which.

MORE DETAILED DESCRIPTION

Figure 1:
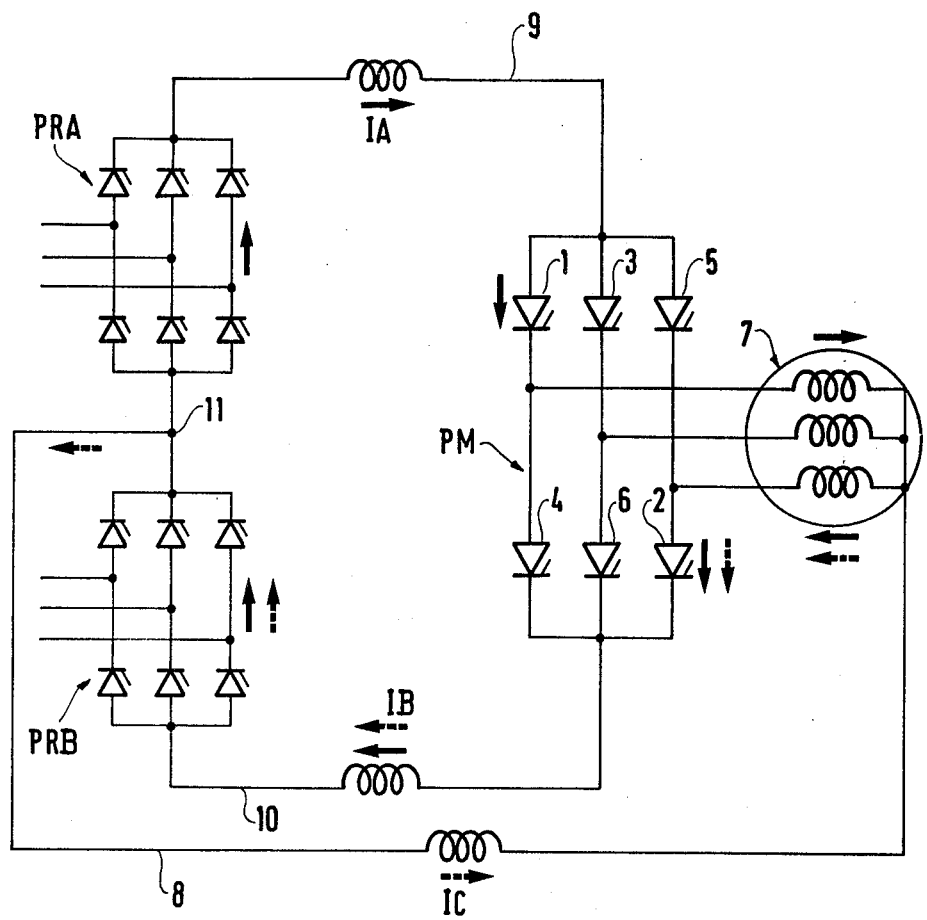
FIG. 1 shows a static converter powering a synchronous motor.

In FIG. 1, a static converter comprises a "machine" bridge PM consisting of six controlled thyristors 1, 2, 3, 4, 5 and 6 whose reference numerals correspond to their firing order, and a "mains" bridge which consists of two complete thyristor bridges: a "mains" bridge A referenced PRA and a "mains" bridge B referenced PRB. The "machine" bridge PM supplies current to a synchronous machine 7. The "mains" bridges PRA and PRB are supplied with current by a three-phase transformer having a double secondary winding (not shown). The "machine" bridge PM is connected to the "mains" bridges PRA and PRB by an upper conductor 9 through which there flows a current IA and by a lower conductor 10 through which there flows a current IB. An auxiliary connection 8 connects the neutral point of the synchronous machine 7 to the point 11 where mains bridges PRA and PRB are connected in series.

In the above-mentioned French patent, the principle consists of performing switching operations in the "machine" bridge PM, to switch off the current in conductors 9 and 10 of the intermediate circuit, one at a time, i.e. not in both at once. The current flowing along the unswitched conductor being able to return via a connection 8 from the neutral point of the synchronous machine 7 to the mid point 11 between the "mains" bridges PRA and PRB for the duration of the switching operation.

In the present invention, the current of the conductor 9 or 10 which remains conductive is forced to rise by a quantity such that it compensates for the reduction in torque experienced by the machine 7 when the current in one of its phases is switched off.

Take a occasion when the current flowing through the thyristor 1 in the machine bridge PM must be switched to the thyristor 3. Before this is done, the conductive thyristors are thyristors 1 and 2. Therefore, the thyristors which need to be switched on are thyristors 2 and 3. To switch the current from thyristor 1 to thyristor 3, the current must be switched off in thyristor 1. To do this, the "mains" bridge PRA must be controlled as a "full inverter". This switches off the current IA flowing along the upper conductor 9. Then, the current IB begins to flow via the auxiliary connection 8 and is labelled current IC.

FIG. 1 illustrates the pre-switching current flowing via the thyristor 1 to the thyristor 3 using full lines and the current which flows during switching using dashed arrows.

The firing angle α of the "mains" bridge PRB is controlled in such a way that the current IB increases as the current IA decreases so as to cancel pulsation in the torque at the shaft of the synchronous machine.

Figure 2:
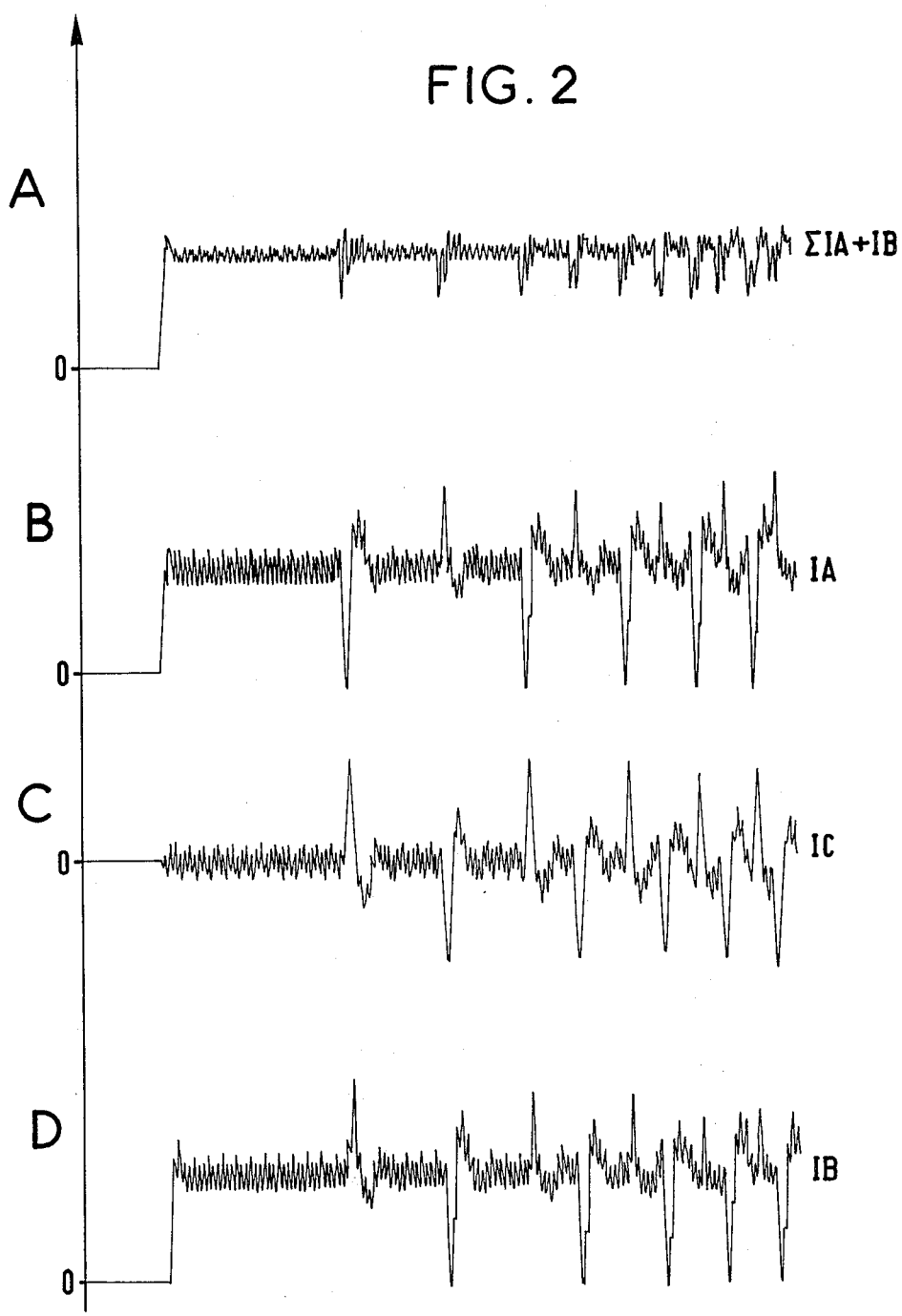
FIG. 2 is a waveform diagram showing the currents at various points.

FIG. 2 graphically illustrates currents;
A illustrates the sum of the currents IA and IB;
B illustrates the current IA;
C illustrates the current IC; and
D illustrates the current IB.

These graphs show that the current IA increases when the current IB decreases and vice-versa. They also show that the sum of the currents IA and IB varies little and that the current IC is close to zero except when switching takes place.

Figure 3:
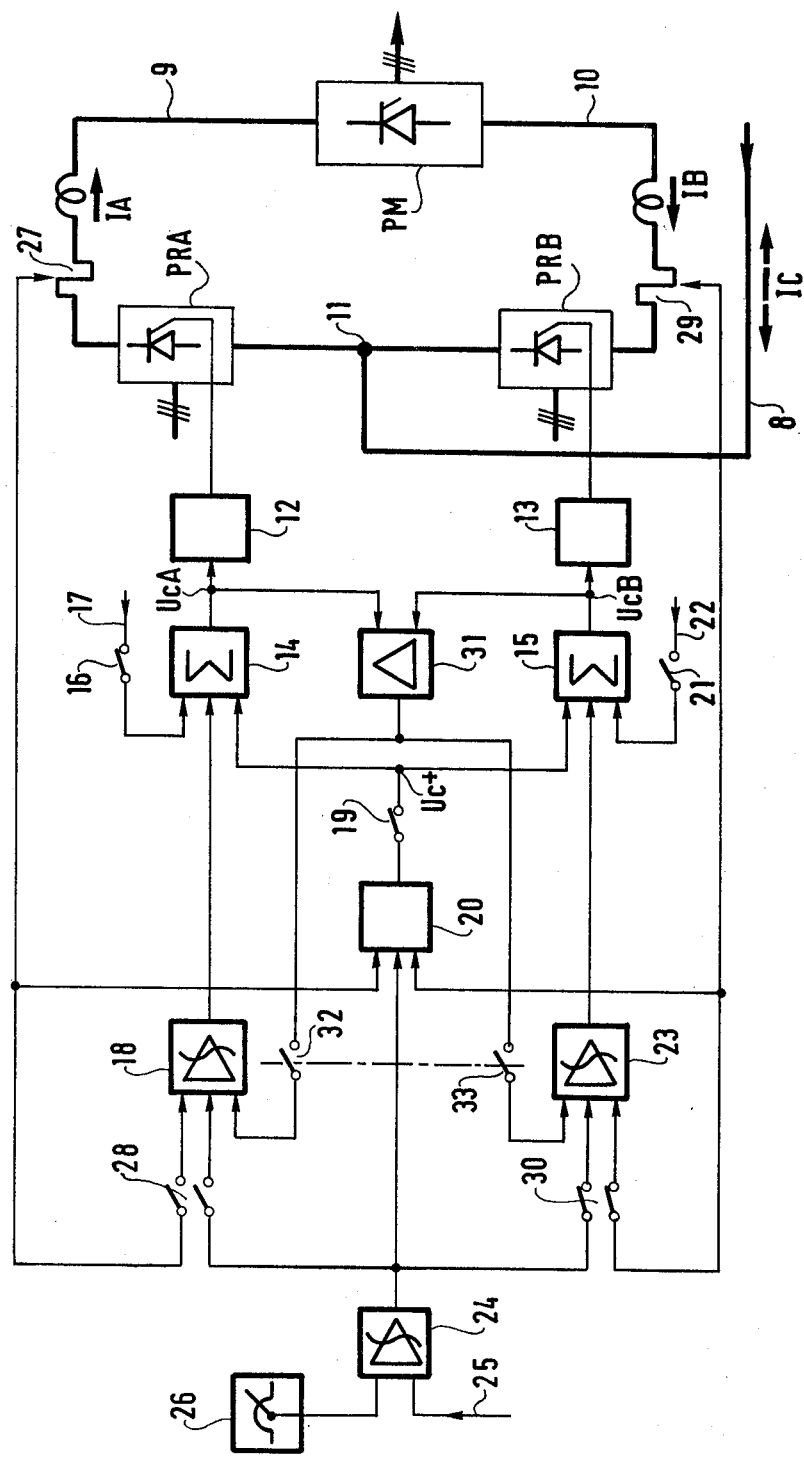
FIG. 3 is a block diagram of a control circuit for controlling the "mains" bridges.

The block diagram of FIG. 3 illustrates an embodiment of means for controlling the mains bridges PRA and PRB which means allow the above-described result to be obtained.

In said figure, the "machine" bridge PM as well as the "mains" bridges PRA and PRB are illustrated in a very simplified way.

Each of the 37 mains" bridges PRA and PRB has a respective circuit 12, 13 for controlling individual pulses and for receiving respective control voltages UcA, UcB delivered by summing circuits 14 and 15.

The summing circuit 14 has three inputs: a first input which receives a "full inverter" instruction from the mains bridge PRA via a gate 16, said order arriving via a conductor 17; a second input which receives an output signal from a regulator 18 for the circuit IA; and the third of which is connected via a gate 19 to a comparator circuit 20. Likewise, the summing circuit 15 also has three inputs, the first of which receives a "full inverter" instruction from the "mains" bridge PRB via a gate 21 and a conductor 22; the second of which receives an output signal from a regulator 23 for the current IB; and the third of which is also connected to the comparator circuit 20 via the gate 19.

The comparator 20 compares the sum of the currents IA+IB with an average current reference signal generated by a speed regulator 24. The output signal of the comparator 20 is proportional to the difference between said average current reference signal and the sum of the currents IA+IB. The speed regulator 24 generates its output signal as a function of a reference speed signal generated by a circuit 26 and the measured speed of the synchronous machine 7, an image signal representative of said synchronous machine speed being applied to an input 25 of the regulator 24. The average current reference signal generated by the speed regulator 24 is also applied to an input of the IA current regulator 18 which also receives a signal representative of the measured value of the current IA, which signal is generated by a current dropper 27. These two signals are applied to the regulator 18 by a gate 28. Likewise, the output signal of the speed regulator 24 is also sent to an input of the IB current regulator 23 which also receives a signal representative of the measured value of the current IB, said signal being generated by a current dropper 29. These two signals are also applied to two inputs of the regulator 23 by a gate 30.

The assembly thus formed further includes a comparator 31 whose output applies a signal ΔUC both to a third input of the regulator 18 via a gate 32 and also to a third input of the regulator 23 via a gate 33. Said signal ΔUC is proportional to the difference between the input signals UcA and UcB at the outputs of the summing circuits 14 and 15.

The assembly operates as follows:

During forced switching operation in so-called sequential operation, therefore slower than some given speed:

(1)—Case of switching between two of the thyristors 1, 3 or 5 (FIG. 1).

The gates 16, 19 and 30 are closed and the gates 21, 28, 32 and 33 are open.

The bridge PRA is controlled "as a full inverter" by sending a "full inverter signal" via the conductor 17 to an input of the summing circuit 14. The bridge PRB receives an extra reference signal UC+which comes from the comparator circuit 20 and controls an increase in the current IB to momentarily compensate the disappearance of the current IA.

Although the regulator 23 of the current IB is in operation, the regulator 18 of the current IA is made to stop operating by the opening of the reference signal and current measurement input gate 28. The regulator remains in its preceding output state i.e. in the state which precedes the switching instant. Normal operation is resumed when switching is over, the signal UcA at the output of the circuit 14 thus returning to the value which it had at the moment when the "machine" bridge PM began switching between the thyristors 1, 3 and 5.

The reference signal Uc+is generated by the comparator 20 which compares the sum of the instantaneous currents IA+IB with the average reference current which comes from the circuit 24.

(2) In the case of the "machine" bridge PM switching between its thyristors 4, 6 and 2, the gates 21, 28 and 19 are closed and the gates 16, 30, 32 and 33 are open, operation is symmetrical to that in the case described hereinabove. In FIG. 3, the gates are illustrated in their states which correspond to a switching operation between thyristors 1, 3, 5.

During normal operation, i.e. during natural switching and not during sequential operation, the gates 32, 33, 28 and 30 are closed and all the other gates are open, the comparator circuit 31 then begins to come into action to force the firing angles of the bridges PRA and PRB to be indentical; indeed, usually, except during sequential operation, it is not required to control the two bridges PRA and PRB independently.

Figure 4:
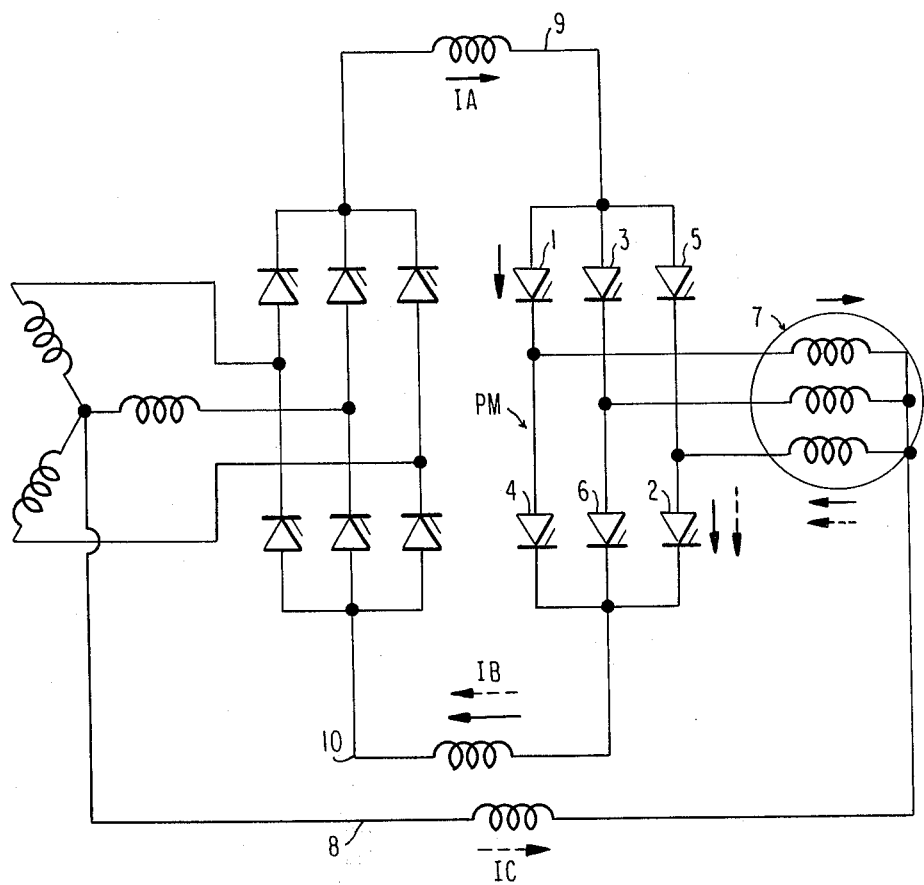
FIG. 4 shows an alternative embodiment of a static converter.

Naturally the mains bridge could be constituted by a single bridge powered from a star secondary winding of a 3-phase transformer, with the connection 8 being connected to the neutral point of said star winding. Such an embodiment is shown in FIG. 4.

I claim:

1. A control apparatus for controlling a static AC/AC thyristor converter for supplying power to a synchronous rotating machine, said converter comprising a machine bridge, a mains bridge connected to receive power from a transformer, first and second conductors connecting said machine bridge and said mains bridge, and an auxiliary connection for returning point current from a neutral point of said synchronous machine to said transformer via said auxiliary connection, said control apparatus comprising:

a speed regulator for supplying an average reference current;

a comparator circuit for comparing said average reference current with a sum of currents flowing in said first and second conductors;

current regulator means for controlling said current flowing on said first and second conductors;

pulse control means; and summing means receiving as a first input an output of said comparator circuit, as a second input an output of said current regulator means, and as a third input a signal for controlling full opening of said converter, an output of said summing means being applied via said pulse control means to control said mains bridge, wherein said sum of said currents flowing in said first and second conductors is maintained equal to said reference value.

2. The control apparatus of claim 1, wherein: said mains bridge comprises two complete thyristor bridges; said current regulator means comprises first and second current regulators for controlling said currents flowing in said first and second conductors, respectively; said summing means comprises first and second summing circuits receiving as said first input said output of said comparator circuit, as said second input an output of a respective one of said current regulator means, and as said third input said signal for controlling full opening of said converter; and said auxiliary connection is connected between said neutral point of said synchronous machine and a series connection point of said mains bridge.

3. The control apparatus of claim 1, wherein: said transformer is a three-phase transformer having a star-configured secondary winding; said mains bridge comprises a single thyristor bridge powered by said star-configured secondary winding; and wherein said auxiliary connection is connected between said neutral point of said synchronous machine and a neutral point of said star-configured secondary winding.

* * * * *